United States Patent Office 2,850,496
Patented Sept. 2, 1958

2,850,496

PREPARATION OF AMINO AZOLE DISULFIDES

Albert F. Hardman, Northampton Township, Summit County, Ohio, assignor to The Goodyear Tire & Rubber Company, Akron, Ohio, a corporation of Ohio No Drawing. Application September 23, 1954
Serial No. 458,627

1 Claim. (Cl. 260—247.1)

This invention relates to amino azole disulfides and to a method of making these materials.

Amino azole disulfides are powerful accelerators of vulcanization of rubber. They can be used to promote the curing of rubber with or without sulfur. These materials are particularly useful in black tread stocks and other compositions containing rubber in which a powerful, yet delayed action, non-scorching accelerator is needed to promote the curing of the rubber.

The compounds with which this invention is concerned are the secondary amino azole disulfides. These compounds have the following general structure:

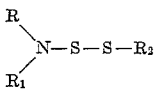

in which R and $R_1$ are the same or different aliphatic, cycloaliphatic or aralkyl groups or R and $R_1$ may together form a single chain or ring and $R_2$ represents a member of the class consisting of thiazoles, oxazoles and imidazoles.

According to this invention amino azole disulfides are prepared by reacting an amine monosulfide with an azyl disulfide. The reaction appears to proceed according to the following equation in which morpholine monosulfide and 2,2'-bis (benzothiazyl) disulfide are used as representative starting materials:

The amine monosulfides can be represented by the structural formula

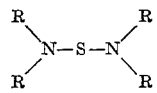

in which the R's are the same or different aliphatic radicals, cycloaliphatic radicals, or aralkyl radicals or in which the pair of R's on a nitrogen atom are joined to form a single ring. Thus, included are the amine monosulfides in which the two R's on a nitrogen atom are a closed chain, which can be interrupted by sulfur, oxygen or an imino group (>NH).

Representative amine monosulfides are the bis secondary amine monosulfides such as N,N'-thio-bis (dimethylamine)
N,N'-thio-bis (diethylamine)
N,N'-thio-bis (di-n-propylamine)
N,N'-thio-bis (di-n-butylamine)
N,N'-thio-bis-diisobutylamine
N,N'-thio-bis-di-n-amylamine
N,N'-thio-bis-diisoamylamine
N,N'-thio-bis-di-n-hexylamine
N,N'-thio-bis-di-n-heptylamine
N,N'-thio-bis-di-n-octylamine
N,N'-thio-bis-dibenzylamine
N,N'-thio-bis-methylcyclohexylamine
N,N'-thio-bis-ethylcyclohexylamine
N,N'-thio-bis (morpholine)
N,N'-thio-bis (thiomorpholine)
N,N'-thio-bis (4-N-ethyl piperazine)
N,N'-thio-bis (piperidine)
N,N'-thio-bis (pyrrolidine)

N,N'-thio-bis (morpholine) and N,N'-thio-bis (di saturated straight chain amines) are preferred species.

The azyl disulfides which can be used include the thiazyldisulfides, the oxazyldisulfides and the imidazyldisul-

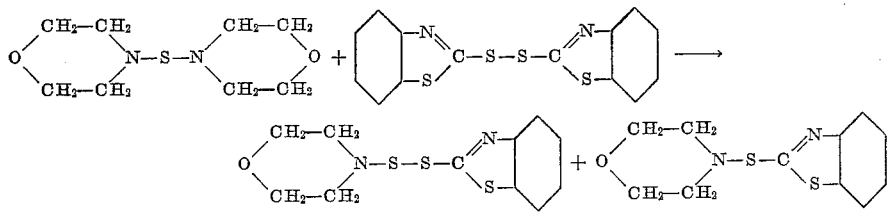

The practice of the invention is illustrated by the following representative example.

EXAMPLE

*Preparation of 2-(4-morpholinyldithio) benzothiazole*

Two and twenty-seven one hundredths grams of N,N'-bis (morpholine) monosulfide, 3.65 grams of 2,2'-bis (benzothiazyl) disulfide, 1 gram of morpholine, as a catalyst, and 10 milliliters of methanol were placed in a small flask set up with a reflux condenser and stirrer. The mixture was refluxed for one hour and cooled. The solid portion was separated by filtration and washed with methanol. A yield of 3.1 grams of 2-(4-morpholinyldithio) benzothiazole was obtained. From the methanol filtrate, 2.3 grams of a second product identified as N-oxydiethylene-2-benzothiazole-sulfenamide was obtained.

Various other amino azole disulfides can be prepared by using other amine monosulfides and other azyldisulfides in place of those shown in the above example.

fides. Both aromatic and aliphatic azyl disulfides can be used. Representative examples are:

2,2'-bis (thiazyl) disulfide
2,2'-bis (oxazyl) disulfide
2,2'-bis (imidazyl) disulfide
2,2'-bis (4-methyl thiazyl) disulfide
2,2'-bis (4-methyl oxazyl) disulfide
2,2'-bis (4-methyl imidazyl) disulfide
2,2'-bis (4-ethyl thiazyl) disulfide
2,2'-bis (4-ethyl oxazyl) disulfide
2,2'-bis (4-ethyl imidazyl) disulfide
2,2'-bis (4-n-propyl thiazyl) disulfide
2,2'-bis (4-n-propyl oxazyl) disulfide
2,2'-bis (4-n-propyl imidazyl) disulfide
2,2'-bis (4-n-butyl thiazyl) disulfide
2,2'-bis (4-n-butyl oxazyl) disulfide
2,2'-bis (4-n-butyl imidazyl) disulfide
2,2'-bis (4,5-dimethyl thiazyl) disulfide
2,2'-bis (4,5-dimethyl oxazyl) disulfide 2,2'-bis (4,5-dimethyl imidazyl) disulfide
2,2'-bis (4,5-diethyl thiazyl) disulfide
2,2'-bis (4,5-diethyl oxazyl) disulfide
2,2'-bis (4,5-diethyl imidazyl) disulfide
2,2'-bis (4,5-di-n-propyl thiazyl) disulfide
2,2'-bis (4,5-di-n-propyl oxazyl) disulfide
2,2'-bis (di-n-propyl imidazyl) disulfide
2,2'-bis (4-phenyl thiazyl) disulfide
2,2'-bis (4-phenyl oxazyl) disulfide
2,2'-bis (4-phenyl imidazyl) disulfide
2,2'-bis (4-phenyl-5-methyl thiazyl) disulfide
2,2'-bis (4-phenyl-5-methyl oxazyl) disulfide
2,2'-bis (4-phenyl-5-methyl imidazyl) disulfide
2,2'-bis (4-phenyl benzothiazyl) disulfide
2,2'-bis (4-phenyl benzoxazyl) disulfide
2,2'-bis (4-phenyl benzimidazyl) disulfide
2,2'-bis (4-chloro benzothiazyl) disulfide
2,2'-bis (4-chloro benzoxazyl) disulfide
2,2'-bis (4-chloro benzimidazyl) disulfide
2,2'-bis (6-chloro benzothiazyl) disulfide
2,2'-bis (6-chloro benzoxazyl) disulfide
2,2'-bis (6-chloro benzimidazyl) disulfide
2,2'-bis (benzothiazyl) disulfide
2,2'-bis (benzoxazyl) disulfide
2,2'-bis (benzimidazyl) disulfide
2,2'-bis (tetrahydro benzothiazyl) disulfide
2,2'-bis (tetrahydro benzoxazyl) disulfide
2,2'-bis (tetrahydro benzimidazyl) disulfide
2,2'-bis (naphthothiazyl) disulfide
2,2'-bis (naphthooxazyl) disulfide
2,2'-bis (naphthoimidazyl) disulfide The benzothiazyl disulfides and particularly 2,2'-bis (benzothiazyl) disulfide are preferred materials.

In preparing these materials solvents may be present, and it is generally preferable to use an amine catalyst to speed up the reactions. Solvents which have been found to be suitable for use in this process are the lower aliphatic alcohols such as methanol, ethanol, isopropanol, normal propanol and normal butanol. Amines which have been found to be effective catalysts are morpholine, cyclohexylamine, and, in general, the amine corresponding to the amine radical of the amine sulfide used in the reaction.

The reaction of the above example was carried out at the reflux temperature of the mixture. Other temperatures can be used, with appropriate adjustment of the time of reaction. The temperature is not critical, but it is desirable to use a temperature that will give reasonably fast reaction rates so that the process may be economically carried out. For most efficient use of the reactants one mol of the amine monosulfide is used to one mol of the azyl disulfide, although other proportions can be used, if desired.

While certain representative embodiments and details have been shown for the purpose of illustrating the invention, it will be apparent to those skilled in this art that various changes and modifications may be made therein without departing from the spirit or scope of the invention.

I claim:

The method of preparing 2-(4-morpholinyl dithio) benzothiazole which comprises reacting N,N'-bis(morpholine)monosulfide with 2,2'-bis(benzothiazyl)disulfide in the presence of morpholine, as a catalyst, in methanol at reflux temperature of the mixture, cooling the mixture and separating the 2-(4-morpholinyl dithio)benzothiazole formed and recovering N-oxydiethylene-2-benzothiazole sulfenamide from the filtrate.

References Cited in the file of this patent

UNITED STATES PATENTS

| | | |
|---|---|---|
| 2,273,321 | Jones | Feb. 17, 1942 |
| 2,747,005 | Zerbe | May 22, 1956 |

UNITED STATES PATENT OFFICE
CERTIFICATE OF CORRECTION

Patent No. 2,850,496                            September 2, 1958

Albert F. Hardman

It is hereby certified that error appears in the printed specification of the above numbered patent requiring correction and that the said Letters Patent should read as corrected below.

Column 1, line 72, after "example" and before the period insert -- ; 2-(di-n-propylaminodithio)benzothiazole by reacting N,N'-thio-bis(di-n-propylamine) with 2,2'-bis(benzothiazyl)disulfide; 2-(di-n-butylaminodithio)benzothiazole by reacting N,N'-thio-bis-(di-n-butylamine) with 2,2'-bis(benzothiazyl)disulfide; and 2-(piperidyldithio)benzothiazole by reacting N,N'-thio-bis(piperidine) with 2,2'-bis(benzothiazyl)disulfide --.

Signed and sealed this 23rd day of December 1958.

(SEAL)
Attest:

KARL H. AXLINE
Attesting Officer

ROBERT C. WATSON
Commissioner of Patents